United States Patent [19]
Donahue

[11] 3,866,968
[45] Feb. 18, 1975

[54] DRAG REDUCING APPARATUS FOR A TRAILER

[76] Inventor: Jack R. Donahue, Vaughn Trailer Park, Box 45, Caro, Mich. 48723

[22] Filed: Sept. 27, 1973

[21] Appl. No.: 401,369

[52] U.S. Cl.................................. 296/1 S, 105/2 A
[51] Int. Cl............................................. B62d 37/02
[58] Field of Search ....... 296/1 S, 91; 105/2 R, 2 A; 224/29 R, 42.03 R, 42.03 A, 42.07, 42.32, 42.34, 42.43

[56] References Cited
UNITED STATES PATENTS

| 2,573,755 | 11/1951 | Abell | 105/2 R |
| 2,781,226 | 2/1957 | Tydon | 296/1 S X |
| 2,816,377 | 12/1957 | Hastings | 224/42.03 R X |
| 3,239,267 | 3/1966 | Reynolds | 296/1 S |
| 3,425,740 | 2/1969 | De Vaughn | 296/1 S |
| 3,484,130 | 12/1969 | Read | 296/1 S |
| 3,697,120 | 10/1972 | Saunders | 296/1 S |
| 3,762,758 | 10/1973 | Wilkerson | 296/1 S |

FOREIGN PATENTS OR APPLICATIONS

| 593,130 | 2/1934 | Germany | 105/2 R |

Primary Examiner—Robert J. Spar
Assistant Examiner—Leslie J. Paperner
Attorney, Agent, or Firm—John J. Swartz

[57] ABSTRACT

Drag reducing apparatus for a travel trailer comprising rearwardly diverging, air diverting walls removably mounted on the front of a trailer.

6 Claims, 10 Drawing Figures

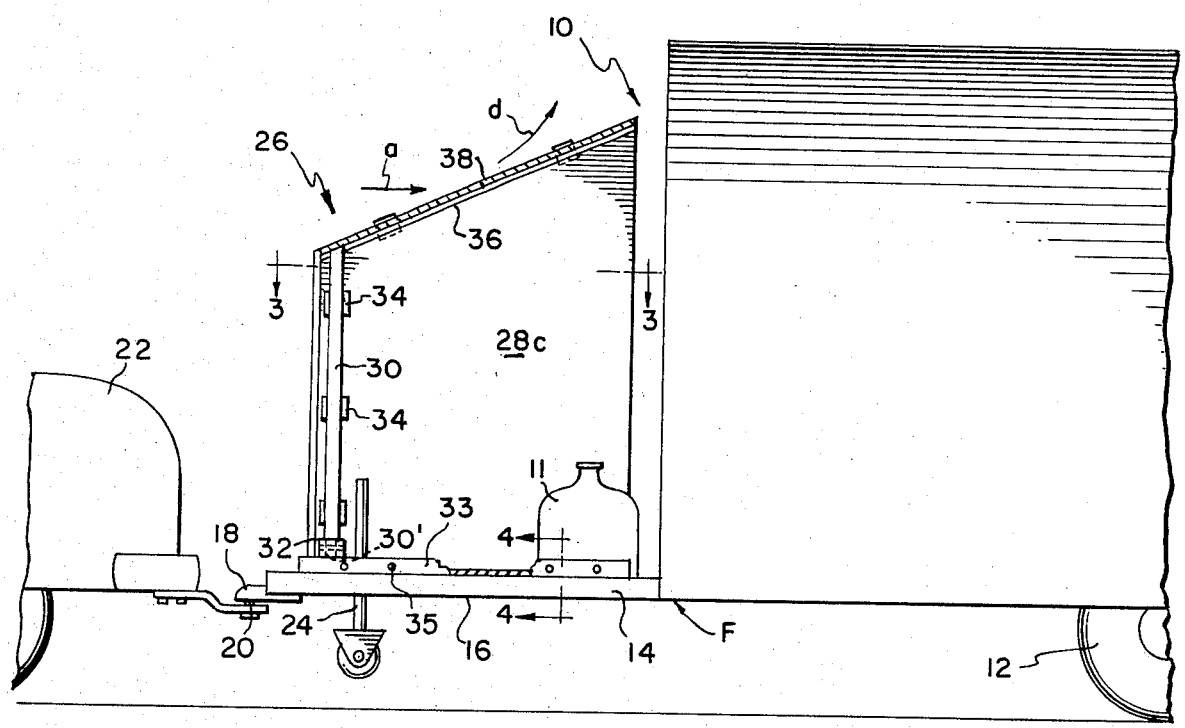
FIG. 1
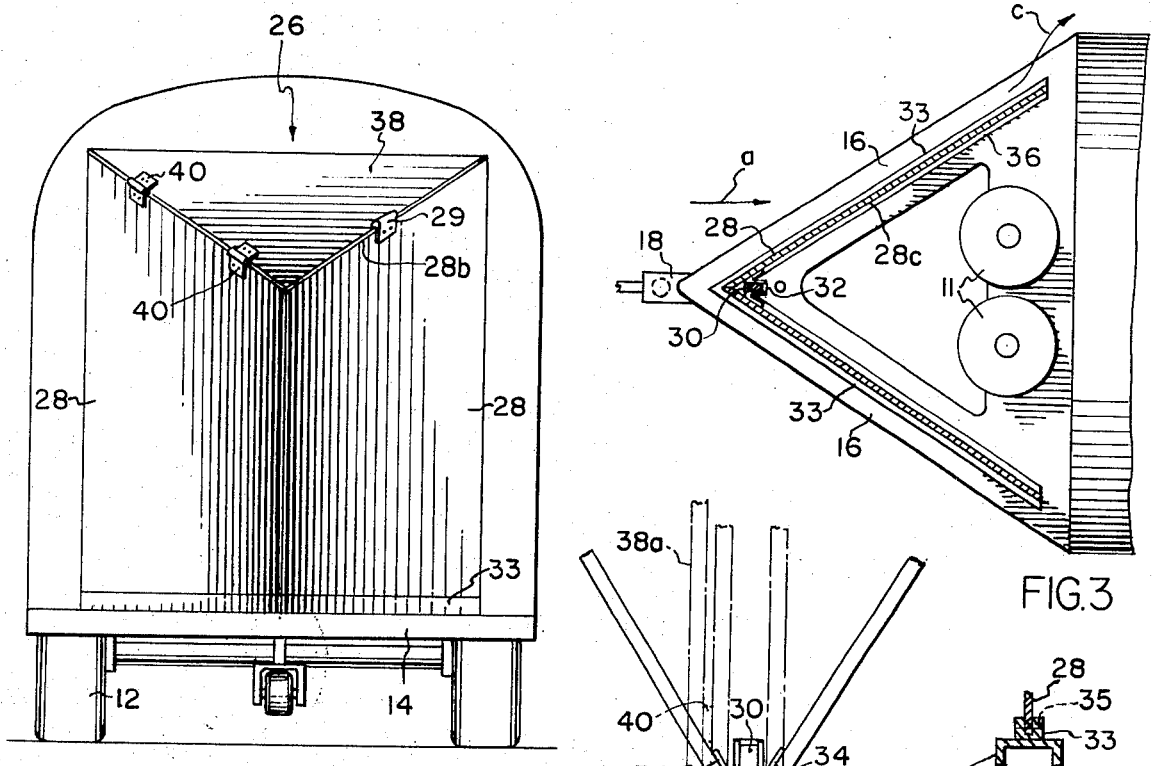
FIG. 2   FIG. 3
FIG. 5   FIG. 4

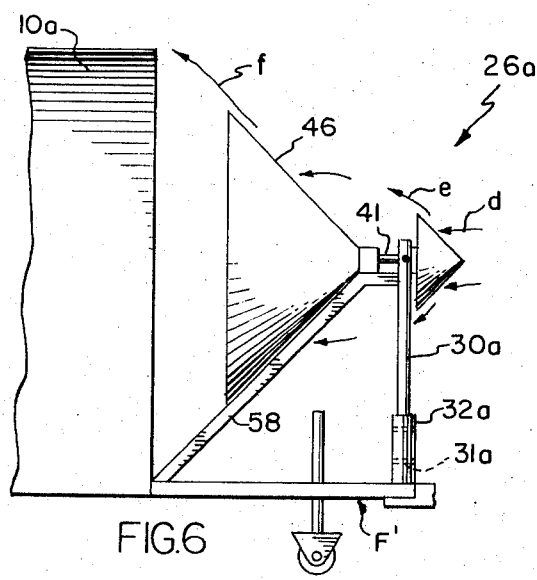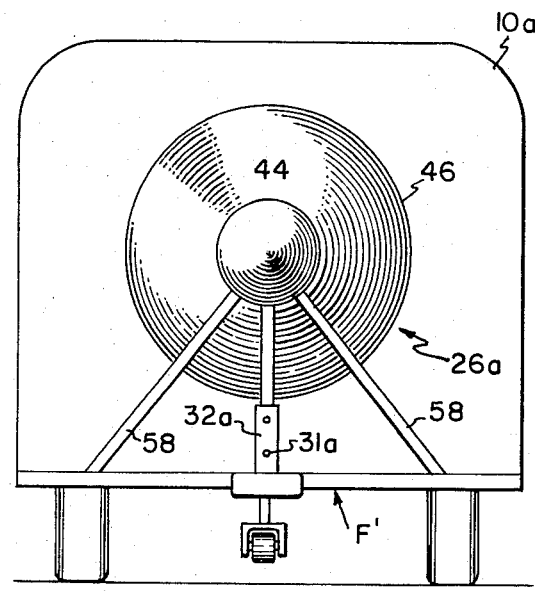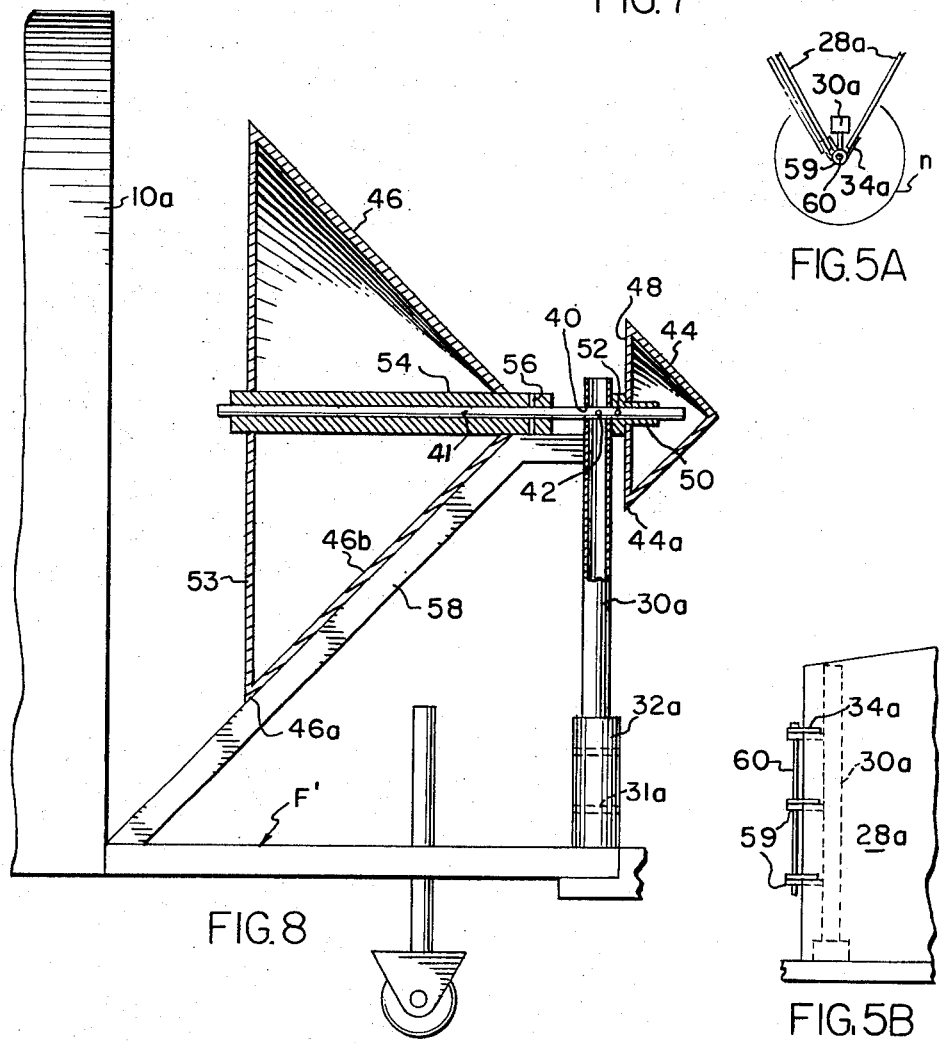

3,866,968

DRAG REDUCING APPARATUS FOR A TRAILER

BACKGROUND OF THE INVENTION

This invention relates to apparatus for decreasing the drag on a moving travel trailer caused by air resistance, and more particularly to air diverting apparatus which can be easily separated from the front of a trailer when the trailer is not in transit.

Many travel trailers include a box-like housing which has a flat front and square corners. Although this configuration provides maximum space inside the trailer, it is most undesirable from an air resistance standpoint in that the retarding force, or drag, caused by the air impinging on the trailer front, increases at an exponential rate as the velocity increases. Variable force air currents impinging on the conventional flat front travel trailers also sometimes cause handling problems at high speeds.

Various permanently mounted air deflectors have been proposed heretofore, but they are not generally aesthetically acceptable and thus have not been widely employed. Accordingly, it is an object of the present invention to provide drag reducing apparatus which can be readily removed from the trailer when the trailer is not in use.

It is another object of the present invention to provide air diverting apparatus for a trailer, mounted on an upstanding post adapted to be removably mounted on the front of the trailer.

Yet another object of the present invention is to provide drag reducing apparatus which can be removed and folded for easy storage when the trailer is not in transit.

Still another object of the present invention is to provide air diverting apparatus of the type described including a pair of air diverting cones disposed in front-to-rear relation.

A further object of the present invention is to provide drag reducing apparatus of the type described having rearwardly diverging walls removably received by upwardly opening channels adapted to be mounted on the trailer.

Other objects and advantages of the present invention will become apparent as the description thereof proceeds.

SUMMARY OF THE INVENTION

Drag reducing apparatus for a travel trailer or the like, including an upstanding mount, adapted to be separably mounted on the front of the trailer and rearwardly diverging air diverting wall means mounted on the upstanding support member.

The present invention may more readily be understood by reference to the accompanying drawings, in which:

FIG. 1 is a partly sectional, side elevational view of apparatus constructed according to the present invention mounted on a trailer;

FIG. 2 is a front end view of the apparatus illustrated in FIG. 1;

FIG. 3 is a sectional top plan view, taken along the line 3—3 of FIG. 1;

FIG. 4 is a sectional end view taken along the line 4—4 of FIG. 1;

FIG. 5 is a top plan view, schematically illustrating the drag reducing apparatus in a folded, inoperative condition removed from the trailer;

FIG. 5A is a view similar to FIG. 5, illustrating a slightly modified construction.

FIG. 5B is a side elevation view of the apparatus illustrated in FIG. 5A;

FIG. 6 is a partly sectional, side elevational view of another slightly modified construction;

FIG. 7 is a front elevational view of the apparatus illustrated in FIG. 6; and

FIG. 8 is an enlarged sectional side view of the apparatus illustrated in FIG. 6.

Apparatus constructed according to the present invention is particularly adapted for use with a portable travel trailer, generally designated 10, having ground-engaging wheels 12, as usual. The trailer 10 includes a frame generally designated F having, at its forward end, a tongue 14 comprising a pair of forwardly converging channel members 16 (FIG. 4) mounting a socket 18 which mounts on the ball hitch 20 of a draft vehicle 22. Also mounted on the tongue 14 is a pair of fuel storage tanks 11 which store fuel for cooking and heating, as usual. A vertically adjustable jack 24 is mounted on the tongue 14 for independently supporting the front of the trailer 10 when it is disconnected from the draft ball 20.

Streamlining or drag reducing apparatus, constructed according to the present invention, is generally designated 26 and includes a pair of rearwardly diverging, generally planar, upstanding, air diverting walls or shields 28. The walls 28 are mounted on an upstanding post 30, which includes a reduced diameter, lower shaft portion 30' telescopically received in an upwardly opening, frame-supported receptacle or post 32, by a plurality of vertically spaced hinge members 34. A pin 31 is removably received in aligned apertures provided in the telescoping posts 30 and 32 to hold the post 32 on the post 30. The vertical side walls 28, when in the operative, air diverting positions illustrated in FIGS. 1 - 3, are received at their lower ends in upwardly opening channels 33 welded or otherwise suitably fixed to the tongue 14. Pins or keys 35 pass through aligned apertures provided in the walls 28 and the channels 33 for separably holding the walls 28 in the channels 33. The front edge portions 28' of the side walls 28 are complementally beveled, as illustrated in FIG. 5.

The upper edge portions 28b of the side walls 28 are upwardly and rearwardly inclined. Mounted on the inside 28c of the walls 28, slightly below the upper edge portions 28b, are rails 36 which support a triangularly shaped, planar, air diverting top wall 38. The top wall 38 is swingably connected to one of the side walls 28 by a pair of hinges 40 which permit the top wall 38 to be swung from a rearwardly and upwardly inclined position illustrated in FIGS. 1 - 3, to a position generally parallel to the walls 28 (as illustrated at 38a in FIG. 5), when the drag reducing apparatus 26 is removed from the trailer and the walls 28 are folded. A latch 29 is provided for locking the top wall 38 in the position illustrated in FIG. 2.

The drag reducing apparatus 26 is conditioned for use by disposing the lower edge portions of the vertical side walls 28 in the channels 33 (FIG. 4) and the lower end 30' of the post 30 in the receptacle 32. The top wall 38 is swung to the position illustrated in FIG. 2 and the pins 31 and 35 are placed in the positions illustrated in FIG. 4 to hold the side walls 28 and the post 30 in the positions illustrated in FIG. 1. The latch 29 locks the top wall in the vertically inclined position illustrated in FIG. 1.

As the trailer 10 travels down the highway, the air which impinges on the side walls 28 and the top wall 38, as represented by the arrows a, will be diverted laterally in the direction of the arrow c, and upwardly in the direction of the arrow d, to pass along the side walls and top walls of the trailer 10.

When the user has reached his destination, the air diverting apparatus 26 is removed from the trailer to provide access to the jack 24, and to the gas tanks 11 by firstly unlocking the latch 29 and swinging the upper wall 38 to a position generally parallel to the wall 28 on which it is mounted. The pins 31 and 35 are then removed and the walls 28 and the post 30 are concurrently lifted from the channels 35 and the receptacle 32 and folded or swung about the post 30 to the generally parallel positions illustrated in chain lines in FIG. 5. The drag reducing apparatus can then easily be stored beneath the trailer or in some other remote location.

THE ALTERNATE EMBODIMENT

Referring now more particularly to FIGS. 5 – 7, air diverting, drag reducing apparatus, generally designated 26a, is mounted on the frame F' of a trailer 10a via an upstanding rod 30a telescopically received in an upwardly opening, frame supported, receptacle 32a. Pins 31a pass through aligned apertures in the posts 30a and 32a to prevent vertical separation thereof.

A horizontal bore 40, provided at the upper end of the upstanding rod 30a, receives a horizontal support rod 41 pinned to the upstanding rod 30a via a pin 42. The drag reducing apparatus 26a includes forward and rearward cone-shaped, air diverting members or shields, generally designated 44 and 46, mounted on the horizontal support rod 41 at opposite sides of the vertical support rod 30a. The forward cone-shaped member 44 includes a back wall 48, spanning the base 44a of the cone 44, and fixed to a sleeve 50 slidably received on the front end of the horizontal support rod 41 and releasably coupled thereto via a pin 52. The rearward cone-shaped member 46 is connected at its forward end to a sleeve 54 slidably supported on the rear end of the horizontal support rod 41 and releasably coupled thereto via a pin 56. The cone-shaped member 46 includes a back wall 53, spanning the base 46a, and fixed to the sleeve 54. The cones 44 and 46 may be fabricated from any suitable material such as synthetic plastic.

The diameter of the base 44a of the cone 44 in substantially smaller than the diameter of the base 46a of the cone 46 so that air which is radially diverted by the forward cone 44, as represented by the arrow e, will impinge on the rear cone 46. A pair of rearwardly diverging support members 58 underlie and support the lower wall 46b of the rear cone 46, and is connected at its forward end to the upstanding post 30a and at its rearward end to the frame F'.

It should be understood that the cones 44 and 46 could comprise a pyramidally shaped configuration having a plurality of flat, triangular side walls with a common vertex.

When the trailer 10a is traveling forward, air impinging on the wall 44, as represented by the arrow d, will be diverted outwardly in the direction of the arrow e where it will impinge on the wall of the rearward cone 46. The air will then be further diverted outwardly in the direction of the arrow f beyond the side and top walls of the trailer 10a.

Referring now to FIG. 5A, another slightly modified construction is illustrated and includes an upstanding post 30a including a plurality of vertically spaced, forwardly projecting hinge plates 59. The walls 28a include vertically spaced hinge plates 34a which are vertically aligned with the plates 59. A vertical hinge pin 60 is removably received in aligned apertures provided in the hinge plates and permits the walls 28a to be relatively swung together in the opposite direction, as represented by the arrow n to the confronting positions illustrated in chain lines in FIG. 5A when the walls 28a are removed from the trailer.

It is to be understood that the drawing and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. Drag reducing apparatus for detachably mounting on the front of a trailer and the like comprising:
    a pair of side walls each having an upwardly, rearwardly inclined upper edge portion;
    means swingably connecting said side walls for movement between rearwardly diverging, operative positions and inoperative, folded positions;
    a top wall; and
    means mounting said top wall on one of said side walls for swinging movement between an upwardly inclined position in which it spans the inclined upper edge portions of said side walls when said side walls are in said operative positions, and a position extending alongside at least one of said side walls when said side walls are in said inoperative positions so that said apparatus can be removed and folded for storage.

2. The apparatus as set forth in claim 1 including upwardly opening, rearwardly diverging slot means removably receiving the lower edge portions of said side walls when said side walls are in said operative positions, means for releasably locking said side walls in said slot means.

3. The apparatus as set forth in claim 1 including an upstanding mounting post, said connecting means comprising a second upstanding post telescopically mounted on said first-mentioned upstanding post, and means articulately connecting the front edge portions of said side walls to said second post for swinging movement between said operative positions in which said front edge portions are engaged and said inoperative positions in which said front edge portions are spaced.

4. The apparatus as set forth in claim 1 wherein means is provided for mounting said top wall flush with the upper edge portions of said side walls when said top wall is in said upwardly inclined position.

5. The apparatus as set forth in claim 1 including upwardly opening, rearwardly diverging channel means adapted to be mounted on said trailer;
    said rearwardly diverging side walls being removably received by said channel means; and
    means for selectively preventing vertical displacement of said side walls out of said channel means.

6. In combination;

a portable trailer having a frame adapted to be moved in a forward path of travel, and a housing mounted on said frame for movement therewith;

streamlining apparatus mounted forwardly of said housing comprising:

air diverting shield means including rearwardly diverging wall means including lower edge portions;

means removable mounting said shield means on said trailer forwardly of said housing including a first upstanding post on said frame forwardly of said trailer housing; and a second upstanding post telescopically separably mounted on said first post so that said air diverting shield can be separated from said trailer and moved to a remote location; and upwardly opening, rearwardly diverging slot means removably receiving the lower edge portions of said wall means.

* * * * *